(12) United States Patent
Gupta et al.

(10) Patent No.: US 10,873,582 B2
(45) Date of Patent: Dec. 22, 2020

(54) SECURITY DESIGN AND ARCHITECTURE FOR A MULTI-TENANT HADOOP CLUSTER

(71) Applicant: JPMorgan Chase Bank, N.A., New York, NY (US)

(72) Inventors: Akhilesh Gupta, West Chester, PA (US); Raja Banerjee, Issaquah, WA (US); James P. Cuddihy, Verona, NJ (US); Jay Rajaram, North Brunswick, NJ (US); Ratikanta Mishra, Bear, DE (US); Suman Kumar Addanki, Chadds Ford, PA (US); Michael Aguiling, Tappan, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 15/602,339

(22) Filed: May 23, 2017

(65) Prior Publication Data

US 2017/0339156 A1    Nov. 23, 2017

Related U.S. Application Data

(60) Provisional application No. 62/340,284, filed on May 23, 2016.

(51) Int. Cl.
*H04L 29/06* (2006.01)
*G06F 16/182* (2019.01)
(Continued)

(52) U.S. Cl.
CPC .......... *H04L 63/101* (2013.01); *G06F 16/182* (2019.01); *G06F 21/604* (2013.01);
(Continued)

(58) Field of Classification Search
CPC ............. G06F 17/3019; G06F 21/6218; G06F 21/604; H04L 63/0807; H04L 63/101; H04L 63/083
(Continued)

(56) References Cited

U.S. PATENT DOCUMENTS

| 2010/0005055 A1 | 1/2010 | An et al. |
| 2014/0108648 A1 | 4/2014 | Nelke et al. |

(Continued)

OTHER PUBLICATIONS

International Search Report and Written Opinion, International Application No. PCT/US2017/033913, dated Sep. 12, 2017, pp. 1-11.

(Continued)

*Primary Examiner* — Jeffrey C Pwu
*Assistant Examiner* — Nega Woldemariam
(74) *Attorney, Agent, or Firm* — Greenberg Traurig LLP

(57) ABSTRACT

Security design and architecture for a multi-tenant Hadoop cluster are disclosed. In one embodiment, in a multi-tenant Hadoop cluster comprising a plurality of tenants and a plurality of applications, a method for identifying, naming, and creating a multi-tenant directory structure in a multi-tenant Hadoop cluster may include (1) identifying a plurality of groups for a directory structure selected from the group consisting of a superuser group, a plurality of tenant groups, and at least one application group; (2) creating an active directory for each of the groups; (3) adding each of a plurality of users to one of the plurality of tenant groups and the application group; (4) creating tenant directories and home directories for the users; and (5) assigning owners, group owners, default permissions, and extended access control lists to the tenant directories and the home directories.

21 Claims, 13 Drawing Sheets

(51) Int. Cl.
*G06F 21/60* (2013.01)
*G06F 21/62* (2013.01)

(52) U.S. Cl.
CPC ........ *G06F 21/6218* (2013.01); *H04L 63/083* (2013.01); *H04L 63/0807* (2013.01)

(58) Field of Classification Search
USPC .......................................................... 726/4
See application file for complete search history.

(56) References Cited

U.S. PATENT DOCUMENTS

| | | |
|---|---|---|
| 2014/0196115 A1* | 7/2014 | Pelykh .................... H04L 63/08 726/4 |
| 2015/0058843 A1 | 2/2015 | Holler et al. |
| 2015/0120791 A1 | 4/2015 | Gummaraju et al. |
| 2015/0120928 A1 | 4/2015 | Gummaraju et al. |
| 2015/0264119 A1 | 9/2015 | Shau et al. |
| 2015/0363167 A1 | 12/2015 | Kaushik |
| 2016/0134616 A1* | 5/2016 | Koushik ............. H04L 63/0807 726/9 |

OTHER PUBLICATIONS

Extended European Search Report, dated Feb. 25, 2020, from corresponding European Patent Application No. 17803387.4.
Paresh, Wankhede; et al, Secure and Multi-Tenant Hadoop Cluster—An Experience, 2nd International Conference on Green High Performance Computing, IEEE, Feb. 26, 2016, pp. 1-7.

* cited by examiner

SECURITY DESIGN AND ARCHITECTURE FOR A MULTI-TENANT HADOOP CLUSTER

RELATED APPLICATIONS

This application claims priority to U.S. Provisional Patent Application Ser. No. 62/340,284, filed May 23, 2016, the disclosure of which is hereby incorporated by reference in its entirety.

BACKGROUND OF THE INVENTION

1. Field of the Invention

The present invention generally relates to a security design and architecture for a multi-tenant Hadoop cluster.

2. Description of the Related Art

Multi-tenancy is an architecture in which a single instance of a software application can serve multiple clients, or tenants. Multi-tenancy can be economical because software development, update costs, and maintenance costs are shared. An example of multi-tenancy is disclosed in U.S. Patent Application Publication No. 2010/0005055, the disclosure of which is hereby incorporated, by reference, in its entirety.

SUMMARY OF THE INVENTION

Security design and architecture for a multi-tenant Hadoop cluster are disclosed. In one embodiment, in a multi-tenant Hadoop cluster comprising a plurality of tenants and a plurality of applications, a method for identifying, naming, and creating a multi-tenant directory structure in a multi-tenant Hadoop cluster may include (1) one of the tenants or applications identifying a plurality of groups for a directory structure selected from the group consisting of a superuser group, a plurality of tenant groups, and at least one application group; (2) one of the tenants or applications creating an active directory for each of the groups; (3) one of the tenants or applications adding each of a plurality of users to one of the plurality of tenant groups and the application group; (4) one of the tenants or applications creating tenant directories and home directories for the users; and (5) one of the tenants or applications assigning owners, group owners, default permissions, and extended access control lists to the tenant directories and the home directories.

In one embodiment, the directory structure may be a HDFS directory structure.

In one embodiment, the application group may include an application functional group and an application human user group In one embodiment, a user added to the tenant group has access to shared resources of the tenant.

In one embodiment, a user added to the application group has access to application resources and shared resources of the tenant.

In one embodiment, shared resources for a first tenant are isolated from shared recourses of a second tenant.

In one embodiment, a first tenant cannot access resources for a second tenant.

In one embodiment, shared resources for a first application are isolated from shared recourses of a second application.

According to another embodiment, in a multi-tenant Hadoop cluster comprising a plurality of tenants and a plurality of applications, a method of providing security to a HDFS application in a multi-tenant Hadoop cluster may include (1) one of the tenants or applications authenticating a client process for a client; (2) one of the tenants or applications receiving from the client a request comprising at least one of a session ticket and a temporary session key from a key distribution center; and (3) one of the tenants or applications authenticating the client based on at least one client authorization and the at least one of the session ticket and the temporary session key.

In one embodiment, the key distribution center may be a Kerberos key distribution center.

In one embodiment, the client may validate with the key distribution center by providing a username and password.

In one embodiment, the method may further include one of the tenants or applications determining at least one group for the client selected from the group consisting of a superuser group, a plurality of tenant groups, and at least one application group.

According to another embodiment, in a multi-tenant Hadoop cluster comprising a plurality of tenants and a plurality of applications, a method for providing security for an application in a multi-tenant Hadoop cluster, may include (1) one of the tenants or applications identifying a plurality of groups and roles for a plurality of tenants, and identifying cross references between the roles and at least one active directory group; (2) one of the tenants or applications creating an active directory for each of the groups; (3) one of the tenants or applications adding each of a plurality of users to a tenant group and an application group; (4) one of the tenants or applications creating base directories for the application schemas; and (5) one of the tenants or applications assigning roles and privileges to the tenants.

In one embodiment, the application may be Apache HIVE or Cloudera Impala.

In one embodiment, the roles and privileges may be based on at least one tenant application requirement.

In one embodiment, the method may further include one of the tenants or applications authenticating an user with a username and password; and one of the tenants or applications authorizing the user using for role-based, fine-grained authorization.

According to another embodiment, in a multi-tenant Hadoop cluster comprising a plurality of tenants and a plurality of applications, a method for providing security for an application in a multi-tenant Hadoop cluster, may include (1) one of the tenants or applications identifying a plurality of Hbase namespaces and groups with permissions to the Hbase namespaces; (2) one of the tenants or applications creating an active directory for each of the groups; (3) one of the tenants or applications creating the Hbase namespaces to meet at least one tenant requirement; and (4) one of the tenants or applications creating a default role for each application with at least one privilege.

In one embodiment, the at least one privilege may control access to a the application.

In one embodiment, the method may further include one of the tenants or applications authorizing a client action using an access control list.

In one embodiment, the method may further include one of the tenants or applications granting a client permission using role-based access control.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

According to embodiments, a multi-tenant cluster may enable multiple tenants to securely share common set of cluster resources, using, for example, strong authentication and authorization policies, rather than physical separation. In one embodiment, the systems and methods may achieve some or all of the following: (1) little or no negative impact to existing Service Level Agreements (SLA); (2) no violation of existing security requirements and policies; (3) do not have to reveal the existence of each tenant residing on this multi-tenant environment; (4) ability to audit actual data access by users (Human & Functional); (5) the ability to report current permissions to datasets; (6) the ability to run multiple concurrent applications with guaranteed resources.

Figure 1:
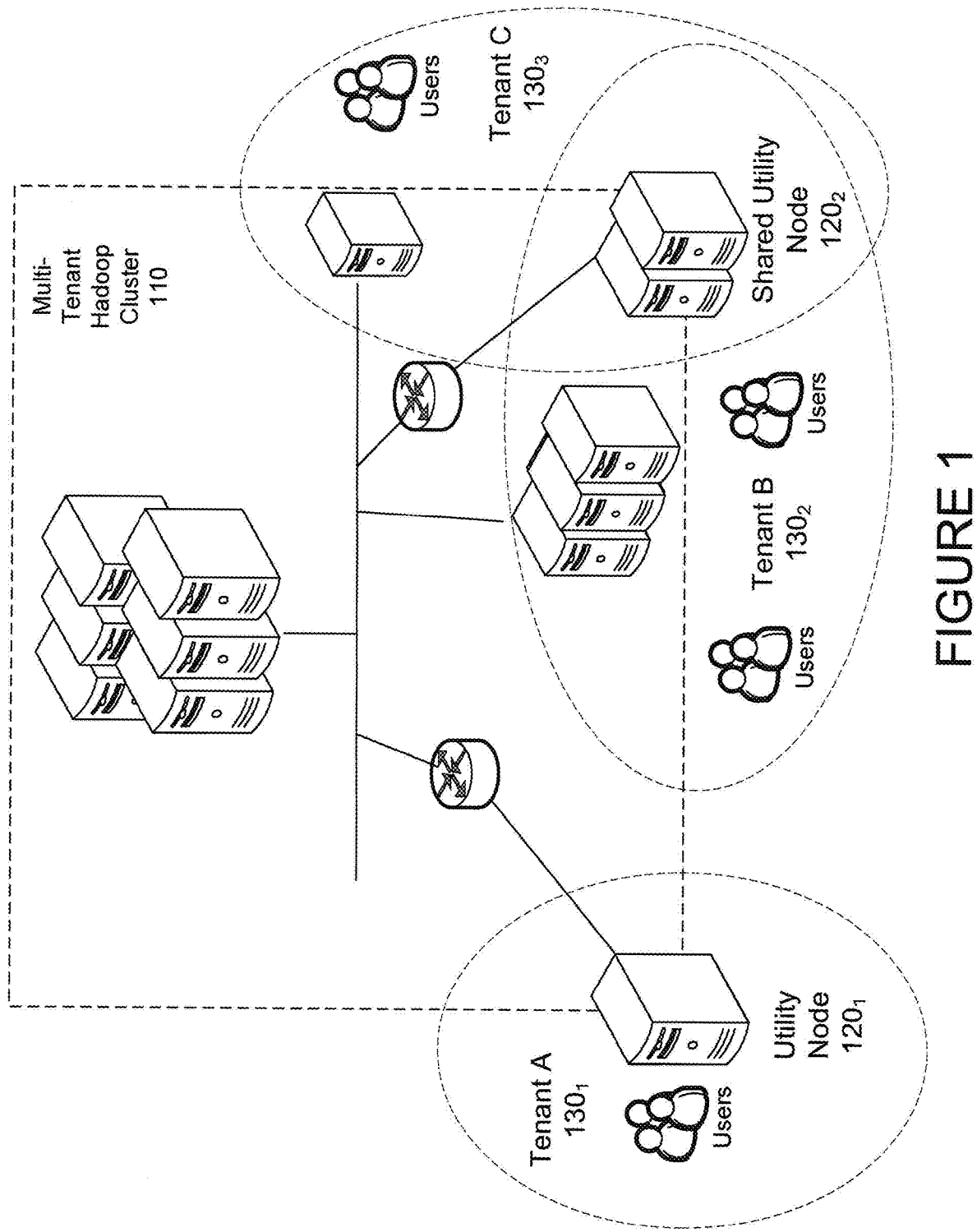
FIG. 1 depicts a multiple tenant cluster according to one embodiment.

Referring to FIG. 1, a multiple tenant cluster is disclosed according to one embodiment. In one embodiment, multiple tenant computing environment 100 may include Multi-tenant Hadoop cluster 110. In one embodiment, Hadoop cluster may be provided for development, production, quality assurance, etc.

In one embodiment, Multi-tenant Hadoop cluster 110 may store, process and analyze large amounts of data. Multi-tenant Hadoop cluster 110 may support multiple services including Hive, yarn, Impala, Hbase, HDFS, and others.

In one embodiment, a plurality of utility nodes $120_1$, $120_2$, etc. may be provided, and may support one or more tenant $130_1$, $130_2$, . . . $130_n$. For example, utility node $120_1$ may support tenant $130_1$, while utility node $120_2$ may support tenants $130_2$ and $130_3$. Any suitable support arrangement maybe used as is necessary and/or desired.

In one embodiment, utility nodes $120_1$, $120_2$, etc. may be the interface between Multi-tenant Hadoop cluster 110 and outside networks. In one embodiment, utility nodes $120_1$, $120_2$, etc. may be used to run client applications and cluster administration tools. Utility nodes $120_1$, $120_2$, etc. may also be used as staging areas for data being transferred into Multi-tenant Hadoop cluster 110.

In one embodiment, a "tenant" may be any business entity within an organization, a vertical, or application that may be paying for, accountable for, etc. the resources in multiple tenant computing environment 100. Example characteristics of a tenant may include (1) multiple tenants reside in a single large cluster (e.g., a Hadoop cluster); (2) each tenant may have one or more applications; (3) each application may have specific requirements for the cluster to meet its needs; and (4) there may be different types of user accounts are present in the cluster. For example, there may be service accounts (e.g., accounts that may be used to run services (e.g., Hadoop services), personal accounts (e.g., accounts that may be used by people accessing the cluster), and functional accounts (e.g., accounts that may be used to run applications). Personal accounts may have access to multiple or single tenants/multiple or single applications.

Figure 2:
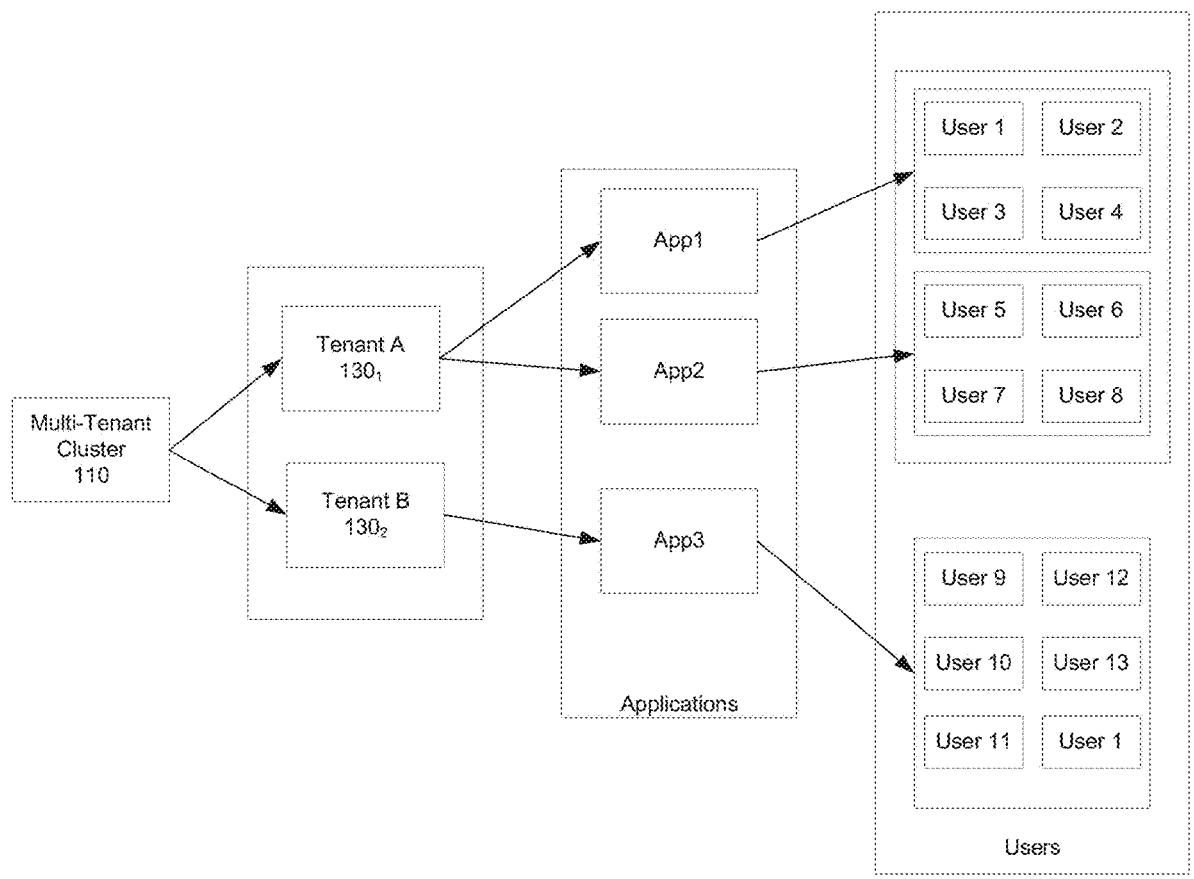
FIG. 2 depicts a multi-tenancy object hierarchy according to one embodiment.

Referring to FIG. 2, a multi-tenancy hierarchy is disclosed according to one embodiment. As illustrated, each tenant $130_1$, $130_2$ may have one or more applications (e.g., App 1, App 2, . . . App n) that may be accessed by one or more user (e.g., User 1-User 13).

Figure 3:
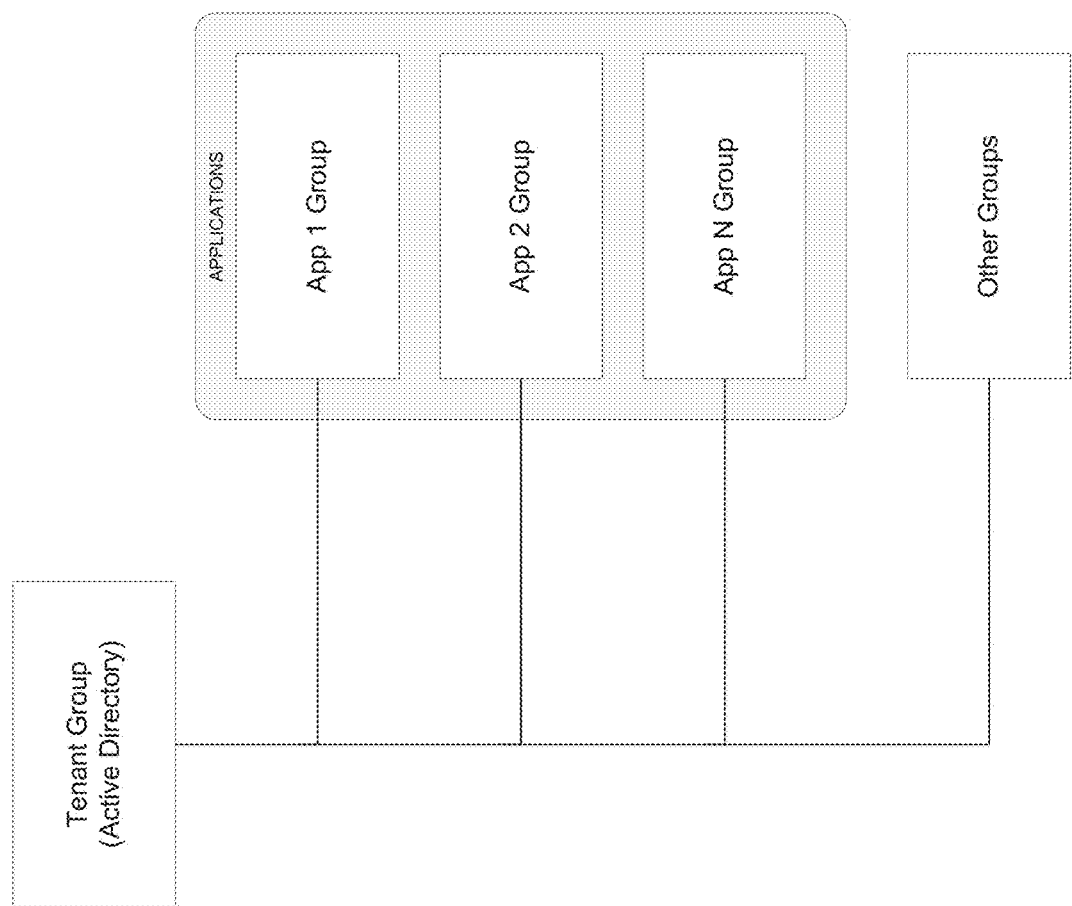
FIG. 3 depicts a logical group structure in an active directory according to one embodiment.
Figure 4:
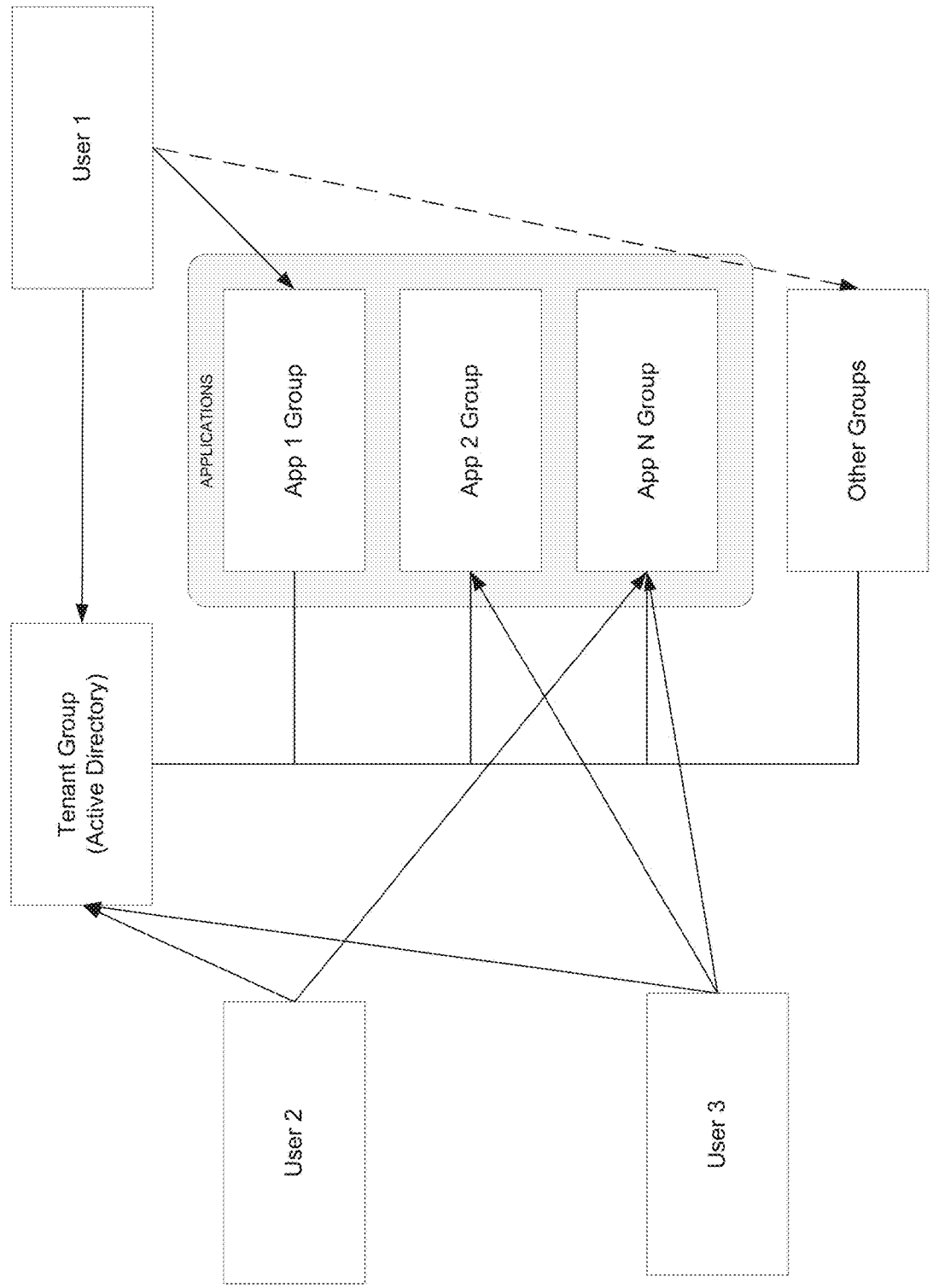
FIG. 4 depicts a user to group mapping according to one embodiment.

Referring to FIGS. 3 and 4, a method for group mapping of a tenant group is disclosed according to one embodiment. In one embodiment, the group mapping strategy may be a combination of Lightweight Directory Access Protocol, or LDAP, based group mapping and static binding. LDAP groups may be used for Personal and Functional accounts, as the users may be managed in an active directory ("AD"). Static binding may be used for service accounts (e.g., HDFS, Hive, Impala, etc.) because these are limited and may be managed in Hadoop configuration files.

Table I below illustrates the different types of groups for a multi-tenant security requirement according to one embodiment:

TABLE I

| Group | Description | Frequency | Advantages |
|---|---|---|---|
| Superuser | Group with all super users | One or more per cluster | |
| Tenant | Users belong to a tenant are placed in a single group | One per Tenant | Access to tenant's shared resources. |
| Application Functional users group | Users working on a single application are placed into these groups. | One for Functional users | Fine-grained access to application resources |
| Application Human users group | | One for Human users | |

In one embodiment, adding a user to a tenant group will allow the user to access only the shared resources of the tenant, but not the application resources. Adding the user to application group will only allow user to access application resources, and not the shared resources of the tenant.

Referring to FIG. 3, a logical group structure in an active directory is illustrated, and in FIG. 4, a user to group mapping is illustrated. In FIG. 4, a solid line indicates that the user belongs to the group, and a dashed line indicates that the user belongs to an admin group. As illustrated, User 1 is a member of the Tenant Group, App 1 Group and an Admin Group; User 2 is a member of the Tenant Group and App N Group; and User 3 is a member of the Tenant Group, App 2 Group, and App N Group.

Figure 5:
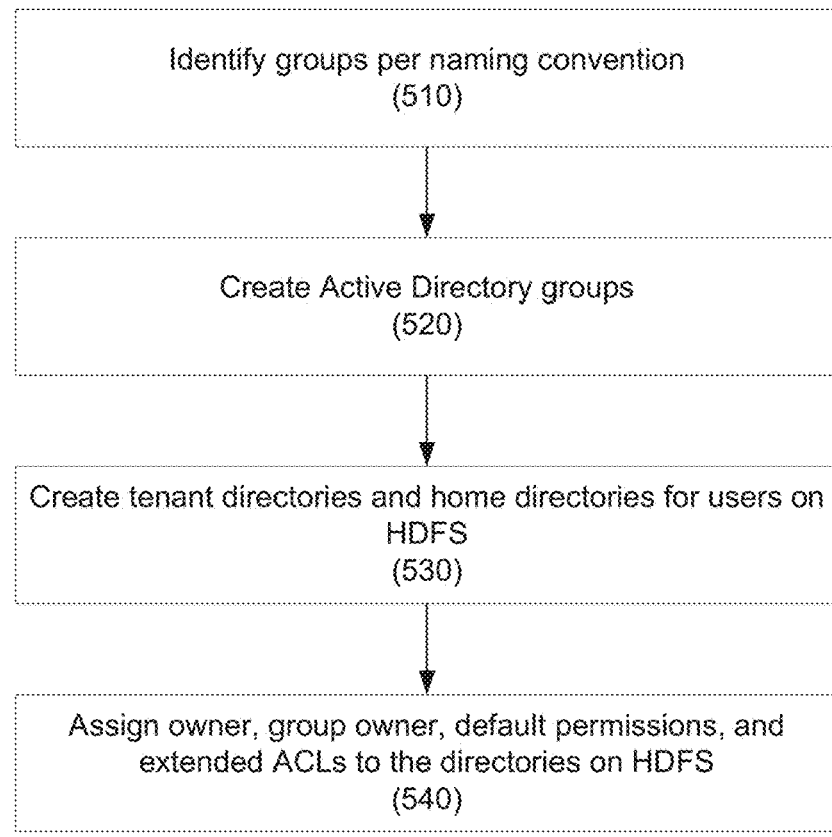
FIG. 5 depicts a method for creating a directory structure for HDFS according to one embodiment.

Referring to FIG. 5, a method for creating a directory structure for HDFS is provided according to one embodiment.

In step 510, groups may be identified per naming conventions. In one embodiment, the exemplary naming convention of Table II may be used:

TABLE II

| Type | Notation | Example | Comments |
|---|---|---|---|
| Supergroup Hadoop group | Supergroup or ND-POC-ADMIN | hdfs | |
| Tenant Hadoop group (AD group) | ND-MT-<TENANT ID> | ND-MT-RTLBNK | N - North America D - Development Region |
| Application Hadoop group (AD Group) | ND-MT-<TENANT-ID>-<APP ID> | ND-MT-RTLBNK-CC | MT - Multi-tenant Cluster (can change this to POC for this existing POC cluster, but how about using this later) TENANTID - Tenant ID/Name APP ID - Application ID Last char (F) indicates that the group is restricted |
| Functional user's group | ND-MT-<TENANT-ID>-<APP ID>-F | ND-MT-RTLBNK-CC-F | |

TABLE II-continued

| Type | Notation | Example | Comments |
|---|---|---|---|
| Tenant Directory (/tenants/<tenant-id>) | TENANT-ID | RTLBNK | only with the functional accounts Other group will include SID's Same as the representation used in Active Directory Group. (Example: RTLBNK for retail banking) |
| Application Directory (/tenants/<tenant-id>/<app-id>) | APP-ID | CC | Same as the representation used in Active Directory Group. (Example: CC for credit cards) |

It should be noted that this naming convention is exemplary only, and any suitable naming convention may be used as is necessary and/or desired.

In step 520, active directory groups may be created, and users may be added to the groups. Any user on-boarded on behalf of an application may be part of at least two groups—a tenant group and an application group.

In step 530, tenant directories and home directories may be created for the users. In one embodiment, a specific HDFS directory structure may be used. An exemplary directory structure is illustrated in FIGS. 6 and 7, and details are proved in Table III, below:

TABLE III

| Directory Level | Description | Parent | Owner | Group owner | Default Permissions | Extended ACLs |
|---|---|---|---|---|---|---|
| Cluster/ tenants | All the tenants go here. | / | hdfs | supergroup | u = rwx, g = r-x, o = r-x | NONE |
| Tenant/ tenats/ <tenant-id> | Resources related to specific tenant goes here. | /tenants/ | hdfs | ND-MT-TENANTID | u = rwx, g = rwx, o = --x | NONE |
| Tenant/ tenats/ <tenant-id>/ shared | Shared directory for all applications. | /tenants/ <tenant-id> | hdfs | ND-MT-TENANTID | u = rwx, g = rwx, o = rwx sticky bit: +t(enabled) | NONE |
| Application/ tenants/tenant-id/<app-id> | Resources related to specific application goes here. | /tenants/ <tenant-id> | hdfs | ND-MT-TENANTID-APPID | u = rwx, g = rwx, o = --X | NONE |
| User/user/ <sid>, /user/ <fid> | User home directories reside. | /user | hdfs | ND-MT-TENANTID or ND-MT-TENANTID-APPID (Tenant owner will decide | u = rwx, g = r-x, o = --- | rwx to user sid/fid and to groups hive, hdfs. |

Figure 6:
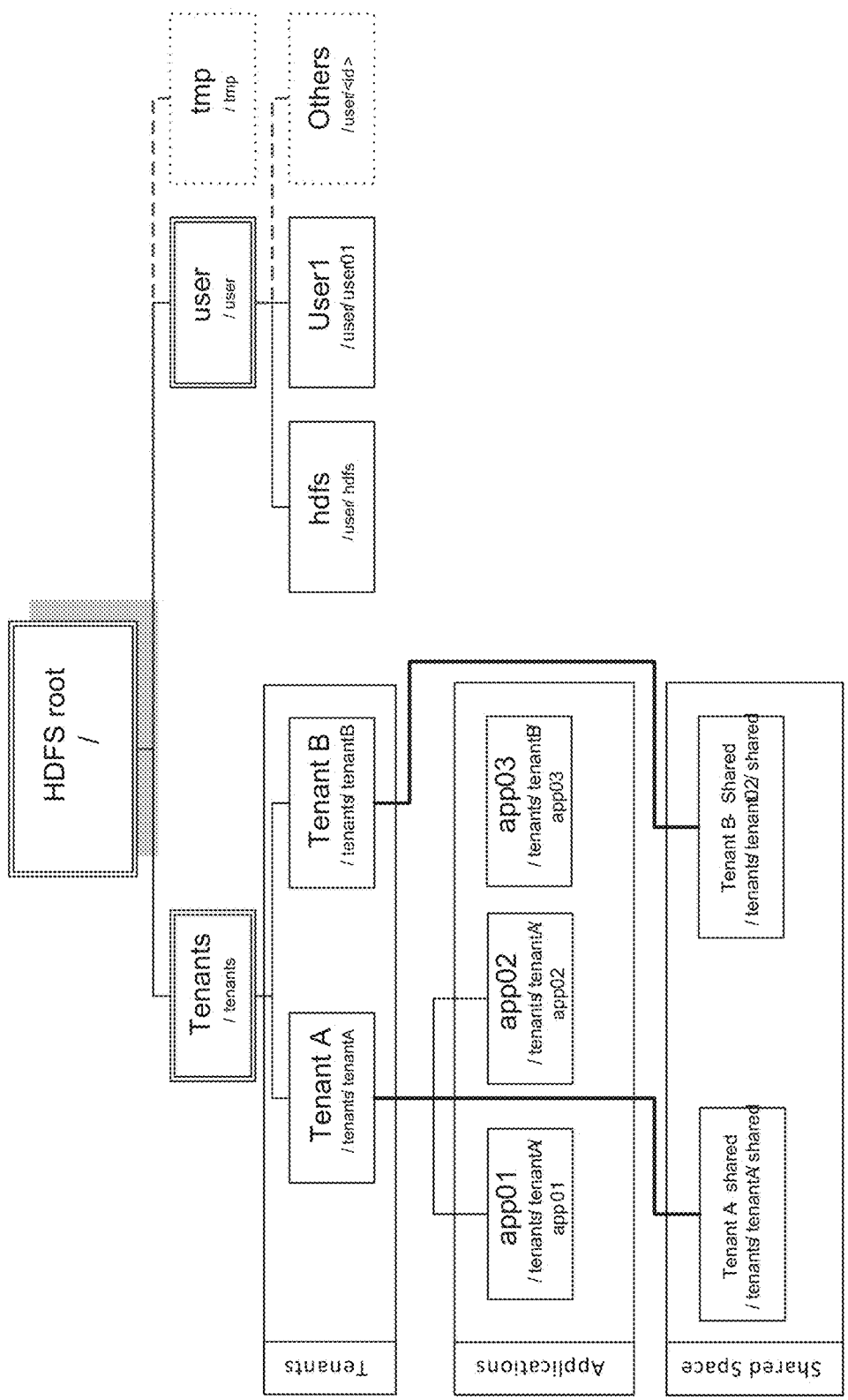
FIG. 6 depicts a HDFS directory structure according to one embodiment.
Figure 7:
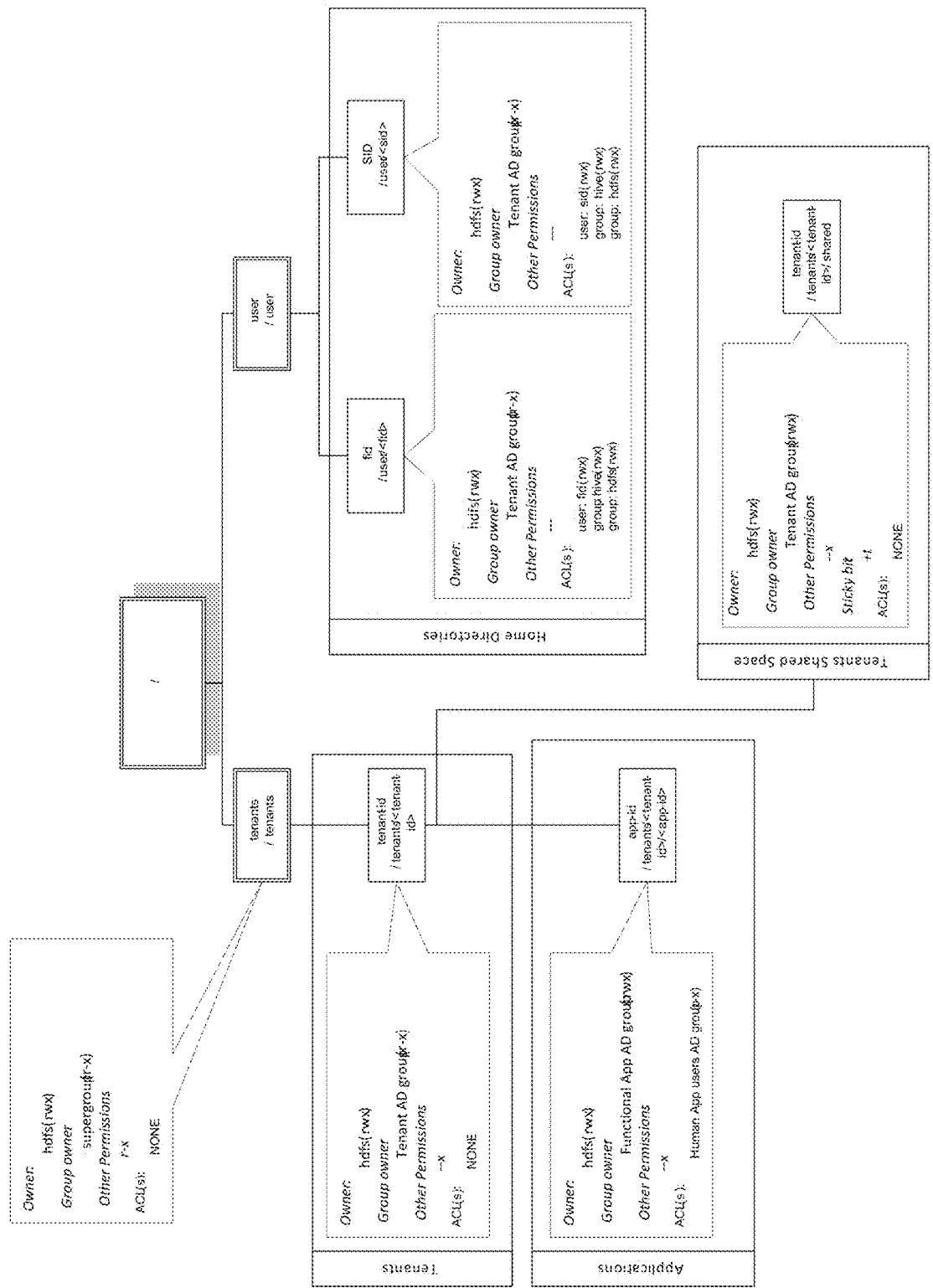
FIG. 7 illustrates an ownership and Access Control Lists of the directories in the HDFS directory structure according to one embodiment.

As FIGS. 6 and 7 illustrate, in one embodiment, the tenants may support multiple applications that may need to be completely isolated. In addition, data may be shared among multiple applications under the same tenant.

In step 540, owners, group owners, default permissions, and extended access control lists (ACLs) may be assigned to the directories. As indicated in Table III, in one embodiment, the ownerships of the tenant, application and shared directories along with ACL's are modeled so that the tenants cannot delete their own base directory, but still have access to the data to meet their application requirements.

FIG. 7 shows the ownership of the user directories that go under/user along with the ACLs that are set. In one embodiment, the user will not have the ability to delete their own home directory but will have access to all the data under their home directory.

In one embodiment, security may be provided. In one embodiment, fine-grained control of permissions to files may be achieved using, for example, ACL and Sentry. In one embodiment, ACLs may be applied depending on the security requirement(s). Sentry may be used for the structured data managed using, for example, Hive, Impala, etc.

In addition, HDFS may be configured to allow communication from the users belonging to the active directory groups of the tenants. In one embodiment, by default, HDFS in the multi-tenant environment may reject all communication except for the users from the allowed active directory groups.

Figure 8:
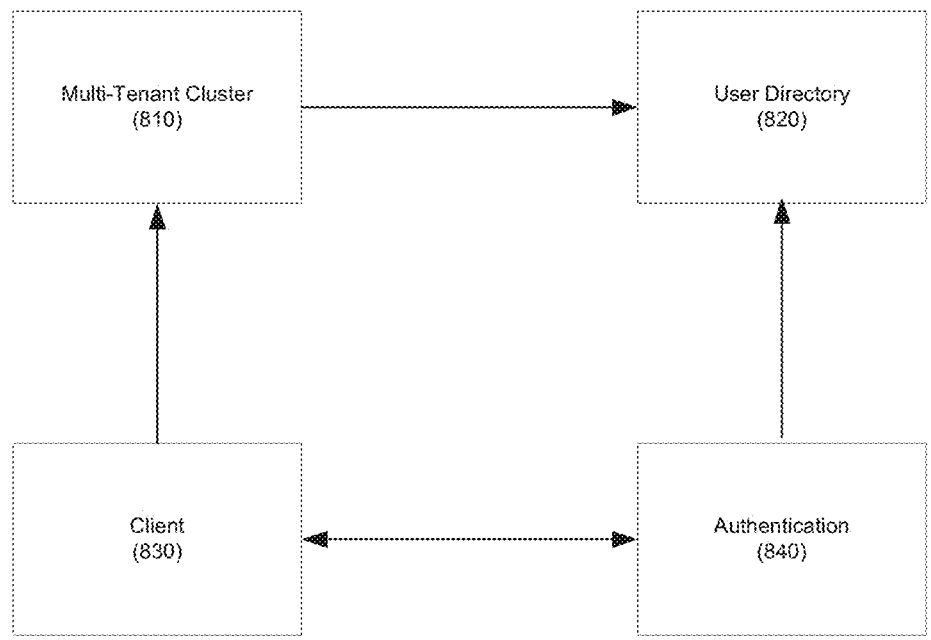
FIG. 8 depicts a method of providing security for HDFS in a multi-tenant cluster according to one embodiment.

Referring to FIG. 8, a method of providing security to an application in a Hadoop multi-tenant cluster is disclosed according to one embodiment. In one embodiment, the application may be the Hadoop Distribute File System, or HDFS. HDFS is designed for storing very large files with streaming data access patterns, running on clusters of commodity hardware. HDFS is a logical collection of files, split and spread across several blocks, whose metadata is stored on the "Namenode."

Hadoop supports two modes of operation to determine a user's identity, which may be specified by the property hadoop.security.authentication. First, simple authentication may be used, whereby the identity of a client process may be determined by the host operating system. Second, Kerberos authentication may be used to authenticate a user.

In one embodiment, once a user's username is determined, the list of groups may be determined by a group mapping service, which may be configured by the hadoop.security.group.mapping property. Example group matching options may include static binding (i.e., user to group mapping is defined in the Hadoop configuration files); shell-based group mapping (i.e., the groups are resolved on the master node (Namenode/resource manager) using the commands "bash-c groups" or "net group")' and LDAP group mapping (i.e., this directly connects to LDAP server to resolve the list of groups).

In one embodiment, multi-tenant cluster 810 may process requests from client 830 that has authenticated against Key Distribution Center (KDC) 840, such as a Kerberos KDC using a username and password from client 830. KDC 840 may validate the username/password with user directory 820. If successfully validated, KDC may provide one or more session ticket and/or temporary session keys to client 830. Client 830 may provide the session ticket/temporary session keys to multi-tenant cluster 810. In one embodiment, multi-tenant cluster 810 may authenticate client 830 using the temporary session key and honor the requests from the client based on the authorizations of client 830.

Figure 9:
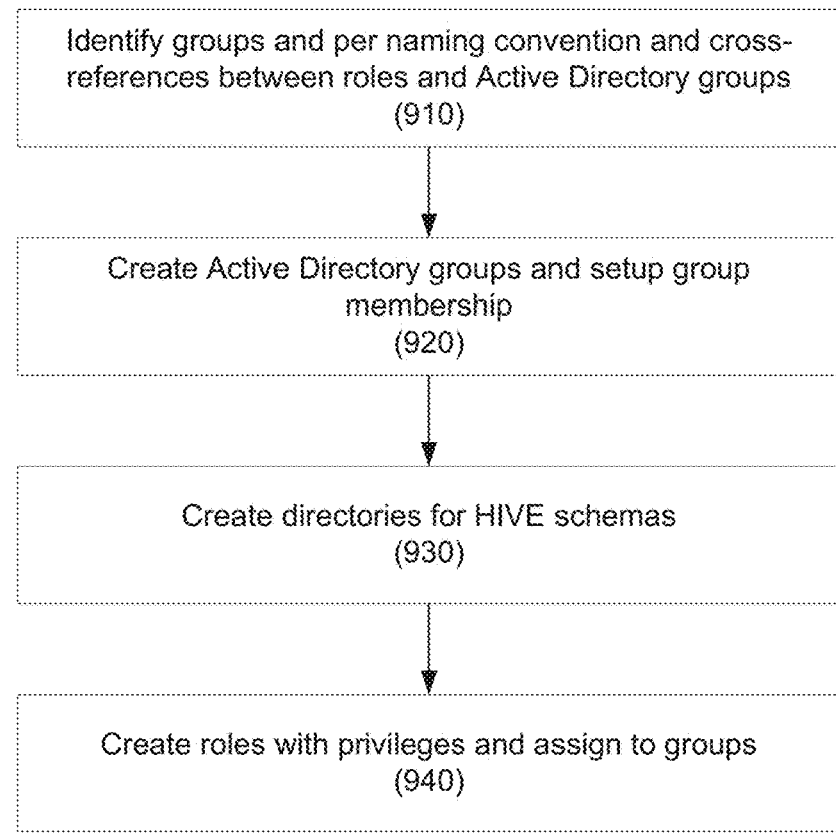
FIG. 9 depicts a method of providing security to HIVE or Impala in a multi-tenant cluster according to one embodiment.

Referring to FIG. 9, a method for providing security to an application in a Hadoop multi-tenant cluster is disclosed according to another embodiment. In one embodiment, the application may be the Apache HIVE data warehouse infrastructure for providing data summarization, query, and analysis. The Hive Query Language (HiveQL) includes a subset of SQL and some extensions that are useful to run analytic queries on large datasets stored in HDFS. Hive may structure data into the well-understood database concepts like tables, columns, rows, and partitions.

In another embodiment, the application may be Cloudera Impala. Impala is an open source massively parallel processing (MPP) SQL query engine for data stored in a computer cluster running Apache Hadoop. Impala integrates with the Apache Hive metastore database to share databases and tables between both components. The high level of integration with Hive, and compatibility with the HiveQL syntax, allows a user to use Impala or Hive to create tables, issue queries, load data, etc.

In one embodiment, security for Hive and Impala may be achieved using authentication (e.g., using Kerberos or user/password validation backed by LDAP) and authorization (e.g., using Sentry for role-based, fine-grained authorization). In one embodiment, a pre-defined directory structure may isolate the structured data stored by each tenant. One base directory per tenant may be created where the tenants can store multiple schemas of structured data in HDFS.

In step 910, groups and roles may be identified per naming conventions. In one embodiment, cross-references between the roles and the active directory groups may be identified. In one embodiment, the exemplary naming convention of Table IV may be used:

TABLE IV

| Type | Notation | Comments |
| --- | --- | --- |
| Data Location (Hive/Impala) | /tenants/<tenant-id>/hive/<db-name>/<tables> | |
| Role | role_<tenantid>_<appid>_<rolename> | Role - prefix<br>Tenant id<br>Application id<br>Role name<br>Underscore '_' as separator |
| Database | db_<tenantid>_<appid>_<dbname> | Db - prefix<br>Tenant ID<br>Application_id<br>Database name<br>Underscore '_' as separator |
| Table | Optional | Specific to application |
| DBA Group | | |

It should be noted that this naming convention is exemplary only, and any suitable naming convention may be used as is necessary and/or desired.

In step 920, active directory groups may be created, and users may be added to the groups. Any user on-boarded on behalf of an application may be part of at least two groups—a tenant group and an application group.

In step 930, the base directory for the structured data may be created for the schemas. In one embodiment, a specific directory structure may be used. An exemplary directory structure is illustrated in FIG. 10, and details are proved in Table V, below:

TABLE V

| Directory Level | Description | Parent | Owner | Group owner | Default Permissions | Extended ACLs |
|---|---|---|---|---|---|---|
| Tenant/ tenats/ <tenant-id>/hive | All the structured data owned by a tenant goes here. | /tenants/ <tenant-id> | hive | hive | u = rwx, g = rwx, o = --x | Derived from Sentry policies |

Figure 10:
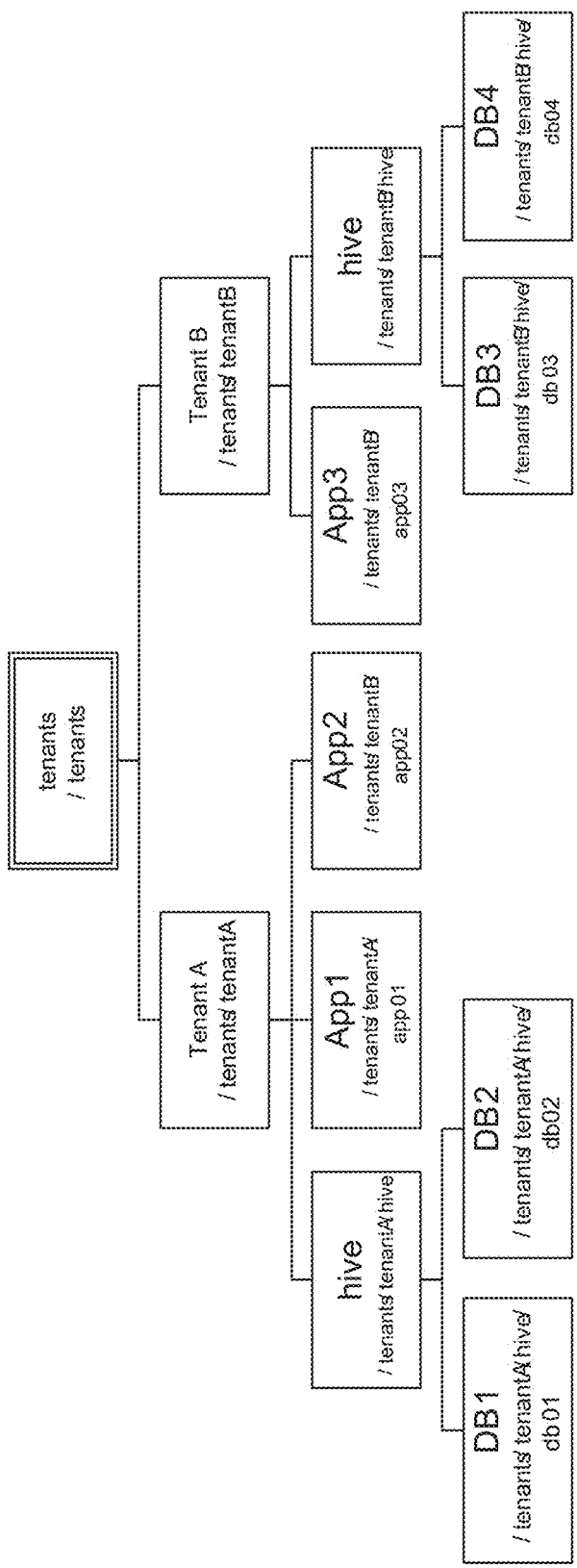
FIG. 10 depicts a structure of HIVE databases and parent directories according to one embodiment.

FIG. 10 shows the structure of HIVE databases along with parent directories. It shows the HIVE base directories for each tenant is in their own tenant directory. The owner, group and the permissions on the hive schema directories are illustrated in Table V.

The base directory ownership may be given to the user HIVE and group HIVE. The permissions to the tenant users on these HIVE schemas may be controlled using the fine grained authorizations provided in, for example, Sentry. Sentry Authorizations may translate automatically into Extended ACLs on the HDFS files and directories.

In one embodiment, attributes for the child directories may include permissions inherited from the parent, ACLs, and Sentry policies.

In step 940, the roles with privileges may be setup. In one embodiment, the inputs for the roles and privileges that go with the roles may be driven by the requirements of the tenant's application(s).

In one embodiment, each tenant may be given a DBA role that has all privileges on their own schemas. This will let the tenants manage the authorizations on their schemas by themselves. The DBA role may be assigned to a special active directory group in which only a service account with additional privileges is onboarded as a member.

In one embodiment, after the roles are created, they may be assigned to active directory groups that were provisioned in the previous steps 910 and 920.

In one embodiment, the assignment may result in the privileges automatically assigned as HDFS ACLs to the files and directories. This may give a consistent authorization to the data regardless of whether it is accessed from HIVE, Impala, or directly through HDFS interface.

Figure 11:
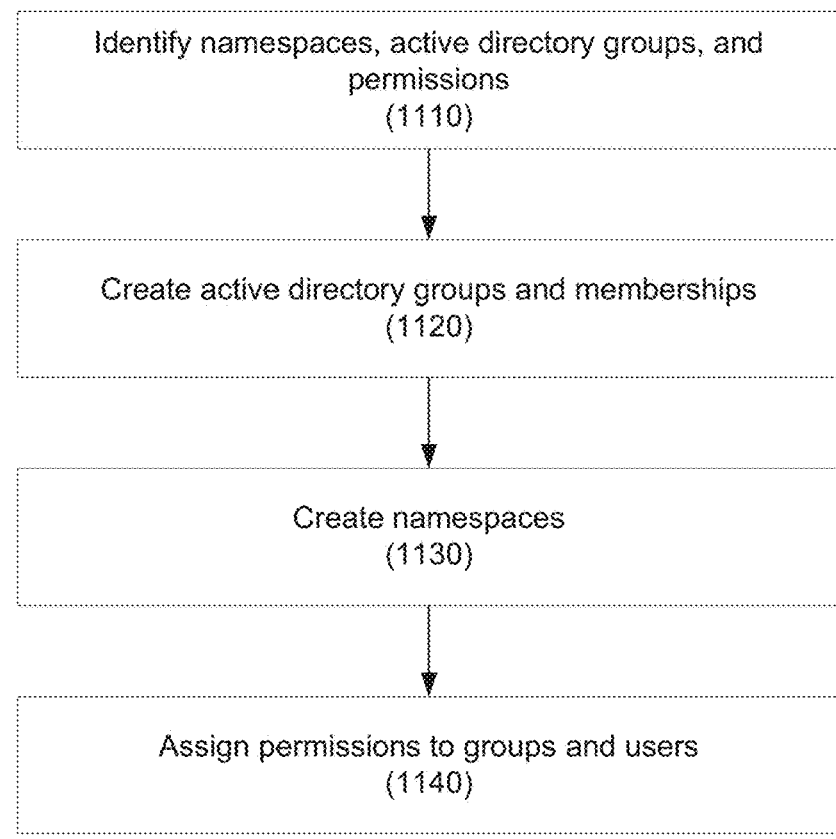
FIG. 11 depicts a method of providing security for Hbase in a multi-tenant cluster according to one embodiment.

Referring to FIG. 11, a method of providing security to an application in a Hadoop multi-tenant cluster is disclosed according to another embodiment. In one embodiment, the application may be Hbase, which is an open source NoSQL database that provides real-time read/write access to those large datasets.

In one embodiment, Kerberos may be used for authentication, whereby Hbase servers and clients may securely identify themselves with HDFS, ZooKeeper, and each other. Access Control Lists, or ACLs, may be used to authorize various operations (READ, WRITE, CREATE, ADMIN) by column, column family, and column family qualifier. Hbase ACLs may be granted and revoked to both users and groups.

In one embodiment, a Hbase security model may use RBAC (Role Based Access Control), whereby access permissions may be stored at the metadata layer and may be applied when a user attempts to access a table or column.

In one embodiment, Hbase may use the same set of permissions for ACLs at the system, namespace, table and column family level. Permissions that are granted at a higher level may be are inherited by objects at the lower level. For example, if namespace-level READ permissions is granted to a group, members of that group can read all tables in that namespace.

Groups may be assigned privileges that effectively enable ownership to namespaces to the tenant level. Tenant administrators/database administrators may control who has access to which tables within their namespace. In one embodiment, different groups at each level in the environment may be required to manage Hbase structured data.

Table VI, below, illustrates different group types and responsibilities according to one embodiment.

TABLE VI

| Group Type | Scope | Description | Responsibilities |
|---|---|---|---|
| HBase Admin (Only 1 per cluster) | Cluster | HBase admin role is the cluster wide administrator for HBase, similar to HDFS superusers. | Grant permissions to Hadoop user groups Create schemas Grant permissions to schemas Adding and dropping tables and namespaces |
| Tenant DBA (Minimum 1 per tenant) | Tenant | Each tenant will be provided DBA on all the namespaces the Tenant owns. | Create/Delete tables only in provided namespaces Grant/Revoke permissions to tables in provided namespaces. |

Table VII, below, describes the purpose and responsibilities of different types of users or groups according to one embodiment. Table VII is exemplary only; an access model may be created based on the application requirements of the Tenants.

TABLE VII

| User/ Group Type | Scope | Description | Responsibilities |
|---|---|---|---|
| Read | Application | Each application will be provided a set of namespaces to meet their specific requirements. | Only reading is allowed Will not be able to write data into tables Will not be able to grant permissions to tables. |
| Write | Application | | Only write to tables allowed within specified schema Will not be able to read data from tables Will not be able to grant permissions to tables. |

In step 1110, the names of the Hbase namespaces and the groups with permissions to them may be identified per naming conventions. In one embodiment, the exemplary naming convention of Table VII may be used:

TABLE VIII

| Type | Notation | Comments |
|---|---|---|
| Data Location | /hbase | |
| Namespace | ns_<tenantid>_<appid>_<namespace> | Db - prefix Tenant ID Application_id namespace Underscore '_' as separator |
| Table | Optional | Specific to application |

It should be noted that this naming convention is exemplary only, and any suitable naming convention may be used as is necessary and/or desired.

In step 1120, active directory groups may be created, and users may be added to the groups. In one embodiment, the users that own and administer the namespaces may be identified and Hadoop groups in Active directory may be created as necessary.

In step 1130, namespaces that meet tenants' requirements may be created.

In step 1140, a default role for each application may be created, and the default role may have one or more of read and/or write privileged.

The following non-limiting examples are provided.

Example 1: HDFS Scenario—on Boarding Two Tenants into a Multi-Tenant Hadoop Cluster—Retail Banking and Corporate Marketing Each of these tenants has multiple applications that they want to run on the multi-tenant cluster and have a specific security requirement:

TABLE IX

| Tenant | Tenant ID | Application | APP ID |
|---|---|---|---|
| Retail Banking | RTLBNK | Credit Card | CC |
| | | Personal banking | PBANK |
| | | Mortgage | MTG |
| Corporate marketing | CORPMKT | Campaign | CAMP |
| | | General Marketing | GMKT |

The requirements are as follows: adding the two tenants along with the applications listed in Table IX, and providing read-only access to data in Personal Banking application to Credit Card application.

In one embodiment, a Hadoop supergroup may be a pre-requisite for the solution described below. An overview of this process is as follows: (1) identify the active directory groups for tenant and applications; (2) create the active directory groups for tenant; (3) create necessary directories and home directories for users; (4) assign owner, group and permissions to the directories; and (4) ACLs.

First, the groups in Table X may be identified in accordance with the naming conventions discussed above.

TABLE X

| Type | Name | Hadoop Groups |
|---|---|---|
| Tenant | Retail Banking | ND-MT-RTLBNK |
| Tenant | Corporate Marketing | ND-MT-CORPMKT |
| Application | Credit Cards | ND-MT-RTLBNK-CC/ ND-MT-RTLBNK-CC-F |
| Application | Personal banking | ND-MT-RTLBNK-PBANK/ ND-MT-RTLBNK-PBANK-F |
| Application | Mortgage | ND-MT-RTLBNK-MTG/ ND-MT-RTLBNK-MTG-F |
| Application | Campaign | ND-MT-CORPMKT-CAMP/ ND-MT-CORPMKT-CAMP-F |
| Application | General Marketing | ND-MT-CORPMKT-GMKT/ ND-MT-CORPMKT-GMKT-F |

Next, Active Directory groups may be created.
Next, users may be added to groups.
Next, the HDFS directories in Table XI may be created with superuser rights with appropriate permissions.

TABLE XI

| Type | Name | Directory | Owner | Group owner | Permissions | Extended ACLs |
|---|---|---|---|---|---|---|
| Tenant | Retail Banking | /tenants/rtlbnk | hdfs | ND-MT-RTLBNK | u: rwx, g: r-x, o: --x | None |
| Tenant | Corporate Marketing | /tenants/corpmkt | hdfs | ND-MT-CORPMKT | u: rwx, g: rwx, o: --x | None |
| Application | Credit Cards | /tenants/rtlbnk/cc | hdfs | ND-MT-RTLBNK-CC-F | u: rwx, g: rwx, o: --x | group: ND-MT-RTLBNK-CC: rwx |
| Application | Personal banking | /tenants/rtlbnk/pbank | hdfs | ND-MT-RTLBNK-PBANK-F | u: rwx, g: rwx, o: --x | group: ND-MT-RTLBNK-PBANK: rwx |
| Application | Mortgage | /tenant/rtlbnk/mtg | hdfs | ND-MT-RTLBNK-MTG-F | u: rwx, g: rwx, o: --x | group: ND-MT-RTLBNK-MTG: rwx |
| Application | Campaign | /tenants/corpmkt/camp | hdfs | ND-MT-CORPMKT-CAMP-F | u: rwx, g: rwx, o: --x | group: ND-MT-CORPMKT-CAMP: rwx |
| Application | General Marketing | /tenants/corpmkt/gmkt | hdfs | ND-MT-CORPMKT-GMKT-F | u: rwx, g: rwx, o: --x | group: ND-MT-CORPMKT-GMKT: rwx |
| User | | /user/<fid/sid> | hdfs | ND-MT-CORPMKT | u: rwx g: r-x o: --- | user: fid/sid: rwx group: hive: rwx group: hdfs: rwx |

Example 2: On Boarding Two Tenants (Retail Banking and Corporate Marketing) into a Multi-Tenant Hadoop Cluster In addition, as shown in Table XII, each of these tenants may have multiple applications they want to run on the multi-tenant cluster and have a specific security requirement.

TABLE XII

| Tenant | Tenant ID | Application | APP ID |
|---|---|---|---|
| Retail Banking | RTLBNK | Credit Card | CC |
| | | Personal banking | PBANK |
| | | Mortgage | MTG |
| Corporate marketing | CORPMKT | Campaign | CAMP |
| | | General Marketing | GMKT |

Requirements:

(1) identify the users who own and administer the database and create Hadoop groups in Active directory if required; (2) create DBA roles for each tenant and attach with specific databases; and (3) create a default role for each application with the read, write, or both, privileges.

In one embodiment, a Sentry Admin group may be setup, which may be named "ND-MT-ADMIN".

Using the Sentry Admin user, a DBA role may be set up for each tenant, and the role may be assigned to a Hadoop group. For example, the Tenant DBA and associated roles are illustrated in Table XIII below.

TABLE XIII

| Tenants | Tenant DBA Hadoop Group | Role with grant option |
|---|---|---|
| Retail Banking | ND-MT-RTLBNK-DBA | mt_rtlbnk_dba |
| Corporate marketing | ND-MT-CORPMKT-DBA | mt_corpmkt_dba |

Exemplary Hadoop groups along with the name of the database for each of tenant applications in this solution is shown in Table XIV below.

TABLE XIV

| Tenants | Application | Database | Tenant DBA group |
|---|---|---|---|
| Retail Banking | Credit cards | db_rtlbnk_cc | ND-MT-RTLBNK-DBA |
| Retail Banking | Personal Banking | db_rtlbnk_pbank | ND-MT-RTLBNK-DBA |
| Retail Banking | Mortgage | db_rtlbnk_mtg | ND-MT-RTLBNK-DBA |
| Corporate Marketing | Campaign | db_corpmkt_camp | ND-MT-CORPMKT-DBA |
| Corporate Marketing | General Marketing | db_corpmkt_gmkt | ND-MT-CORPMKT-DBA |

In one embodiment, to set up the "Retail Banking" tenant account and databases, the following steps may be used: (1) create a role named "mt_rtlbnk_dba" with grant option; (2) grant role "mt_rtlbnk_dba" to group "ND-MT-DIG-DBA"; and (3) grant full permissions on the URI (location in HDFS to store the structured data for this tenant) to role "mt_rtlbnk_dba". This allows the tenant level DBA(s) to access the data in the specified HDFS location, and any user in the group ND-MT-RTLBNK-DBA can work as Tenant DBA for Retail Banking.

Next, (4) create a database "db_rtlbnk_cc"; (5) grant all privileges on database "db_rtlbnk_cc" to tenant dba role "mt_rtlbnk_dba"; (6) create a database "db_rtlbnk_pbank"; and (7) grant all privileges on database "db_rtlbnk_pbank" to tenant dba role "mt_rtlbnk_dba"

In one embodiment, to set up the "Corporate Marketing" tenant DBA role and the databases the following steps may be used: (1) create a role named "mt_corpmkt_dba" with grant privilege; (2) grant role "mt_rsk_dba" to group "ND-MT-CORPMKT-DBA"; and (3) grant full permissions on the URI (location in HDFS to store the structured data for this tenant) to role "mt_corpmkt_dba". This allows the tenant level dba(s) to access the data in the specified HDFS location, and any user in the group ND-MT-CORPMKT-DBA can work as Tenant DBA for Risk.

Next, (4) create a database "db_corpmkt_camp"; (5) grant all privileges on database "db_corpmkt_camp" to tenant dba role "mt_corpmkt_dba"; (6) create a database "db_corpmkt_gmkt"; and (7) grant all privileges on database "db_corpmkt_gmkt" to tenant dba role "mt_corpmkt_dba."

In one embodiment, each tenant may have application-specific security requirements, and they need the following three roles in each application—read only, write, and all. These roles may be application-level sentry roles and privileges for tenants.

In one embodiment, the following roles may be created by, for example, the Sentry Admin: Roles used for "Credit Card" application ("mt_rtlbnk_cc_insert"; "mt_rtlbnk_cc_read"; and "mt_rtlbnk_cc_all"); roles used for "Personal Banking" application ("mt_rtlbnk_pbank_insert"; "mt_rtlbnk_pbank_read"; "mt_rtlbnk_pbank_all"). In one embodiment, the Sentry DBA may create any additional roles as needed by the application security requirements.

Figure 12:
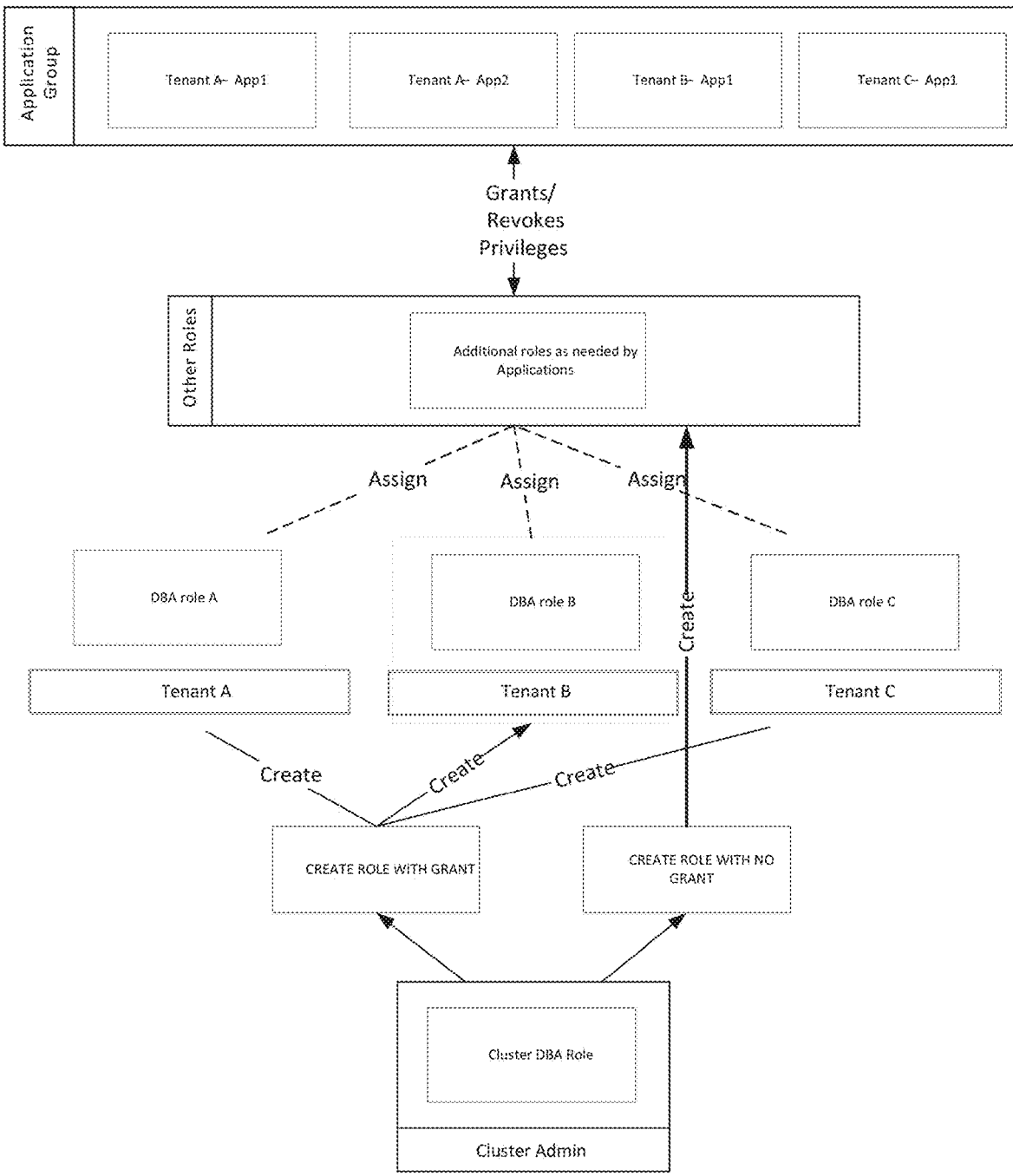
FIG. 12 depicts responsibilities of a Sentry DBA and a tenant DBA and how the necessary privileges are granted to the appropriate groups according to one embodiment.

FIG. 12 depicts responsibilities of a Sentry DBA and a tenant DBA and how the necessary privileges are granted to the appropriate groups according to one embodiment.

Figure 13:
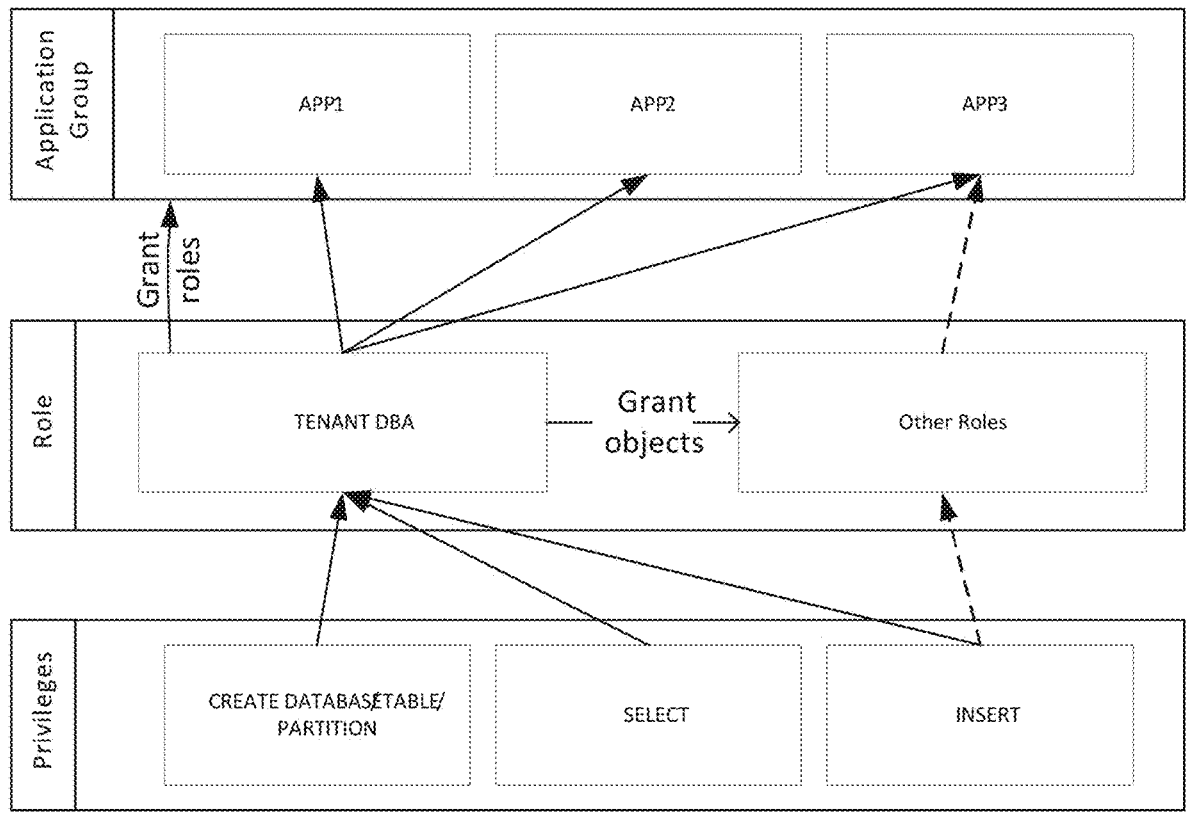
FIG. 13 illustrates how a tenant DBA grants the necessary privileges to the appropriate groups according to one embodiment.

FIG. 13 illustrates how a tenant DBA grants the necessary privileges to the appropriate groups according to one embodiment.

It should be noted that although several embodiments have been disclosed, the embodiments disclosed herein are not exclusive to one another.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for identifying, naming, and creating a multi-tenant directory structure in a multi-tenant Hadoop cluster, comprising:
   in a single multi-tenant multi-node Hadoop cluster comprising a plurality of nodes, a plurality of tenants, and a plurality of applications:
      one of the tenants or applications identifying a plurality of groups for a multi-level directory structure selected from the group consisting of a superuser group, a plurality of tenant groups, and at least one application group;
      one of the tenants or applications creating an active directory for each of the groups;
      one of the tenants or applications adding each of a plurality of users to one of the plurality of tenant groups and the application group;
      one of the tenants or applications creating tenant directories and home directories for the users;
      one of the tenants or applications assigning owners, group owners, default permissions, and extended access control lists (EACL) to the tenant directories and the home directories, wherein the EACLs prevent unauthorized tenants from accessing resources in the tenant directories and the home directories; and
      one of the tenants or applications creates a tenant shared space for sharing data between applications within the tenant;
      wherein shared resources for a first tenant in the multi-node Hadoop cluster are isolated from a second tenant in the multi-node Hadoop cluster when the shared resources are in use by the first tenant, and
      wherein shared resources for the first tenant in the multi-node Hadoop cluster are shared with the second tenant in the multi-node Hadoop cluster when the shared resources are not in use by the first tenant.

2. The method of claim 1, wherein the multi-level directory structure is a HDFS directory structure.

3. The method of claim 1, wherein the application group comprises an application functional group and an application human user group.

4. The method of claim 1, wherein a user added to the tenant group has access to shared resources of the tenant.

5. The method of claim 1, wherein a user added to the application group has access to application resources and shared resources of the tenant.

6. The method of claim 1, wherein a first tenant cannot access resources for a second tenant.

7. The method of claim 1, wherein shared resources for a first application group are isolated from shared recourses of a second application group.

8. The method of claim 1, further comprising: reporting current access permissions for each tenant in the multi-node Hadoop cluster.

9. A method of providing security to a HDFS application in a multi- tenant Hadoop cluster comprising:
   in a single multi-tenant multi-node Hadoop cluster comprising a plurality of nodes, a plurality of tenants, and a plurality of applications:
      one of the tenants or applications authenticating a client process for a client;

one of the tenants or applications receiving from the client a request comprising at least one of a session ticket and a temporary session key from a key distribution center;

one of the tenants or applications authenticating the client based on at least one client authorization and the at least one of the session ticket and the temporary session key; and one of the tenants or applications assigning owners, group owners, default permissions, and extended access control lists (EACL) to the tenant directories and the home directories, wherein the EACLs prevent unauthorized tenants from accessing resources in the tenant directories and the home directories;

wherein shared resources for a first tenant in the multi-node Hadoop cluster are isolated from a second tenant in the multi-node Hadoop cluster when the shared resources are in use by the first tenant, and wherein shared resources for the first tenant in the multi-node Hadoop cluster are shared with the second tenant in the multi-node Hadoop cluster when the shared resources are not in use by the first tenant.

10. The method of claim 9, wherein the key distribution center is a Kerberos key distribution center.

11. The method of claim 9, wherein the client validates with the key distribution center by providing a username and password.

12. The method of claim 11, further comprising: one of the tenants or applications determining at least one group for the client selected from the group consisting of a superuser group, a plurality of tenant groups, and at least one application group.

13. A method for providing security for an application in a multi-tenant Hadoop cluster, comprising:

in a single multi-tenant multi-node Hadoop cluster comprising a plurality of nodes, a plurality of tenants, and a plurality of applications:

one of the tenants or applications identifying a plurality of groups and roles for a plurality of tenants, and identifying cross references between the roles and at least one active directory group;

one of the tenants or applications creating an active directory for each of the groups;

one of the tenants or applications adding each of a plurality of users to a tenant group and an application group;

one of the tenants or applications creating base directories for the application schemas;

one of the tenants or applications assigning roles and privileges to the tenants using extended access control lists (EACL); and one of the tenants or applications creates a tenant shared space for sharing data between applications within the tenant, wherein the EACLs prevent an unauthorized tenant from accessing the tenant shared space;

wherein shared resources for a first tenant in the multi-node Hadoop cluster are isolated from a second tenant in the multi-node Hadoop cluster when the shared resources are in use by the first tenant, and wherein shared resources for the first tenant in the multi-node Hadoop cluster are shared with the second tenant in the multi-node Hadoop cluster when the shared resources are not in use by the first tenant.

14. The method of claim 13, wherein the application is Apache HIVE.

15. The method of claim 13, wherein the application is Cloudera Impala.

16. The method of claim 13, wherein the roles and privileges are based on at least one tenant application requirement.

17. The method of claim 13, further comprising:

one of the tenants or applications authenticating an user with a username and password; and one of the tenants or applications authorizing the user using for role-based, fine-grained authorization.

18. A method for providing security for Hbase in a multi-tenant Hadoop cluster, comprising:

in a single multi-tenant multi-node Hadoop cluster comprising a plurality of nodes, a plurality of tenants, and a plurality of applications:

one of the tenants or applications identifying a plurality of Hbase namespaces and groups with permissions to the Hbase namespaces;

one of the tenants or applications creating an active directory for each of the groups;

one of the tenants or applications creating the Hbase namespaces to meet at least one tenant requirement;

one of the tenants or applications creating a default role for each application with at least one privilege; and one of the tenants or applications creates a tenant shared space for sharing data between applications within the tenant, wherein an Extended Access Control List prevents an unauthorized tenant from accessing the tenant shared space;

wherein shared resources for a first tenant in the multi-node Hadoop cluster are isolated from a second tenant in the multi-node Hadoop cluster when the shared resources are in use by the first tenant, and wherein shared resources for the first tenant in the multi-node Hadoop cluster are shared with the second tenant in the multi-node Hadoop cluster when the shared resources are not in use by the first tenant.

19. The method of claim 18, wherein the at least one privilege controls access to a the application.

20. The method of claim 18, further comprising: one of the tenants or applications authorizing a client action using an access control list.

21. The method of claim 18, further comprising: one of the tenants or applications granting a client permission using role-based access control.

* * * * *